US009276507B2

(12) United States Patent
Bruyere et al.

(10) Patent No.: US 9,276,507 B2
(45) Date of Patent: Mar. 1, 2016

(54) ROTARY DRIVE SYSTEM, METHOD FOR CONTROLLING AN INVERTER AND ASSOCIATED COMPUTER PROGRAM

(71) Applicants: VALEO SYSTEMES DE CONTROLE MOTEUR, Cergy Pontoise (FR); ARTS, Paris (FR)

(72) Inventors: Antoine Bruyere, Evequemont (FR); Xavier Kestelyn, La Chapelle d'Armentieres (FR); Eric Semail, Lille (FR); Paul Sandulescu, Hellemmes-Lille (FR); Fabien Meinguet, La Hulpe (BE)

(73) Assignees: VALEO SYSTEMES DE CONTROLE MOTEUR, Cergy Pontoise (FR); ARTS, Paris (FR)

( * ) Notice: Subject to any disclaimer, the term of this patent is extended or adjusted under 35 U.S.C. 154(b) by 141 days.

(21) Appl. No.: 14/247,587

(22) Filed: Apr. 8, 2014

(65) Prior Publication Data
US 2014/0306627 A1  Oct. 16, 2014

(30) Foreign Application Priority Data

Apr. 10, 2013 (FR) ...................................... 13 53229

(51) Int. Cl.
| H02P 6/12 | (2006.01) |
| H02P 6/00 | (2006.01) |
| H02P 21/00 | (2006.01) |
| H02M 7/5387 | (2007.01) |

(52) U.S. Cl.
CPC ........... *H02P 6/002* (2013.01); *H02M 7/53875* (2013.01); *H02P 21/0021* (2013.01)

(58) Field of Classification Search
CPC ....................................................... H02P 6/002
USPC .................................................... 318/400.15
See application file for complete search history.

(56) References Cited

U.S. PATENT DOCUMENTS

| 2002/0036860 | A1* | 3/2002 | Bi | ........................ | G11B 21/106 360/77.05 |
| 2004/0135534 | A1* | 7/2004 | Cullen | .................... | G05B 17/02 318/609 |
| 2006/0030972 | A1* | 2/2006 | Schlueter | .................. | H02J 3/00 700/292 |
| 2007/0168065 | A1* | 7/2007 | Nixon | ................ | G05B 19/0426 700/83 |
| 2013/0013122 | A1* | 1/2013 | Dyess | ................ | F24F 11/0086 700/295 |

* cited by examiner

Primary Examiner — Erick Glass
(74) Attorney, Agent, or Firm — Young & Thompson

(57) ABSTRACT

The rotary drive system includes: a direct voltage source (102); an electric motor (104) having an axis of rotation (A), and including independent phases having directions about the axis of rotation; an inverter (106) for connecting each phase to the direct voltage source (102); and a control device (110) for supplying a command to the inverter (106). The control device includes: elements (118) for selecting a formula from predefined formulas, each predefined formula being intended to calculate either a homopolar voltage set-point, or a homopolar current set-point; elements (124) for determining a set-point intended to apply the selected formula to determine, according to the formula selected, either a homopolar voltage set-point, or a homopolar current set-point, and elements (126) for determining a command intended to determine the command of the inverter (106) based on the set-point determined.

18 Claims, 2 Drawing Sheets

ROTARY DRIVE SYSTEM, METHOD FOR CONTROLLING AN INVERTER AND ASSOCIATED COMPUTER PROGRAM

FIELD OF THE INVENTION

The present invention relates to a rotary drive system, a method for controlling an inverter and an associated computer program.

BACKGROUND OF THE INVENTION

The prior art includes the use of a rotary drive system of the type comprising:
- a direct voltage source,
- an electric motor having an axis of rotation, and comprising independent phases having directions about the axis of rotation,
- an inverter for connecting each phase to the direct voltage source, and
- a control device for supplying a command to the inverter.

In some drive systems, the control device is intended to control the inverter so as to obtain a zero homopolar current in the electric motor, so as to meet some objectives, whereas in other drive systems, the control device is intended to control the inverter so as to obtain a non-zero homopolar current in the electric motor, so as to meet other objectives.

It may be sought to have a drive system suitable for meeting a plurality of objectives during the operation thereof.

SUMMARY OF THE INVENTION

In order to address the above problem at least in part, the invention relates to a rotary drive system of the abovementioned type, characterised in that the control device comprises:
- means for selecting a formula, said means being intended to select a formula from predefined formulas, each predefined formula being intended to calculate either a homopolar voltage set-point, or a homopolar current set-point,
- means for determining a set-point, said means being intended to apply the selected formula to determine, according to the formula selected, either a homopolar voltage set-point, or a homopolar current set-point, and
- means for determining a command, said means being intended to determine the command of the inverter based on the set-point determined.

By means of the invention, it is possible to adapt the electrical operation of the electric motor in order to meet various objectives, and particularly inject a different homopolar current or voltage to meet these objectives, during the operation of the electric motor.

Optionally, the means for selecting a formula are intended to make the selection based on at least one parameter relating to the rotary drive system.

Optionally, the parameter(s) relating to the rotary drive system include an operating characteristic of the electric motor, for example the rotational speed thereof.

Optionally, the means for selecting a formula comprise:
- definitions of zones of the space defined by the parameter(s) relating to the rotary drive system, each zone being associated with one of the predefined formulas,
- means for determining a zone, said means being intended to determine, from the predefined zones, the zone corresponding to the parameter(s) relating to the rotary drive system, and
- means for retrieving the formula associated with the zone determined by the means for determining a zone.

Optionally, the means for selecting a formula comprise at least one definition of a zone associated with a formula for calculating a homopolar current set-point.

Optionally, the means for selecting a formula comprise at least one definition of a zone associated with a formula for calculating a homopolar voltage set-point.

Optionally, the means for selecting a formula comprise at least one definition of a zone associated with a formula for calculating a set-point in the form of a homopolar harmonic, for example in the form of the first homopolar harmonic.

Optionally, the means for selecting a formula comprise at least one definition of a zone associated with a formula for supplying a zero set-point.

The invention also relates to a method for controlling an inverter for connecting, to a direct voltage source, each phase of an electric motor having an axis of rotation, and comprising independent phases having directions about the axis of rotation, the method comprising:
- selecting a formula from predefined formulas, each predefined formula being intended to calculate either a homopolar voltage set-point, or a homopolar current set-point,
- applying the selected formula to determine, according to the formula selected, either a homopolar voltage set-point, or a homopolar current set-point,
- determining a command of the inverter based on the set-point defined.

The invention also relates to a computer program comprising instructions which, when run on a computer, cause the computer to perform the steps of a method according to the invention.

BRIEF DESCRIPTION OF THE DRAWINGS

An example of an embodiment of the invention will now be described, with reference to the appended figures, wherein.

DETAILED DESCRIPTION OF THE INVENTION

Figure 1:
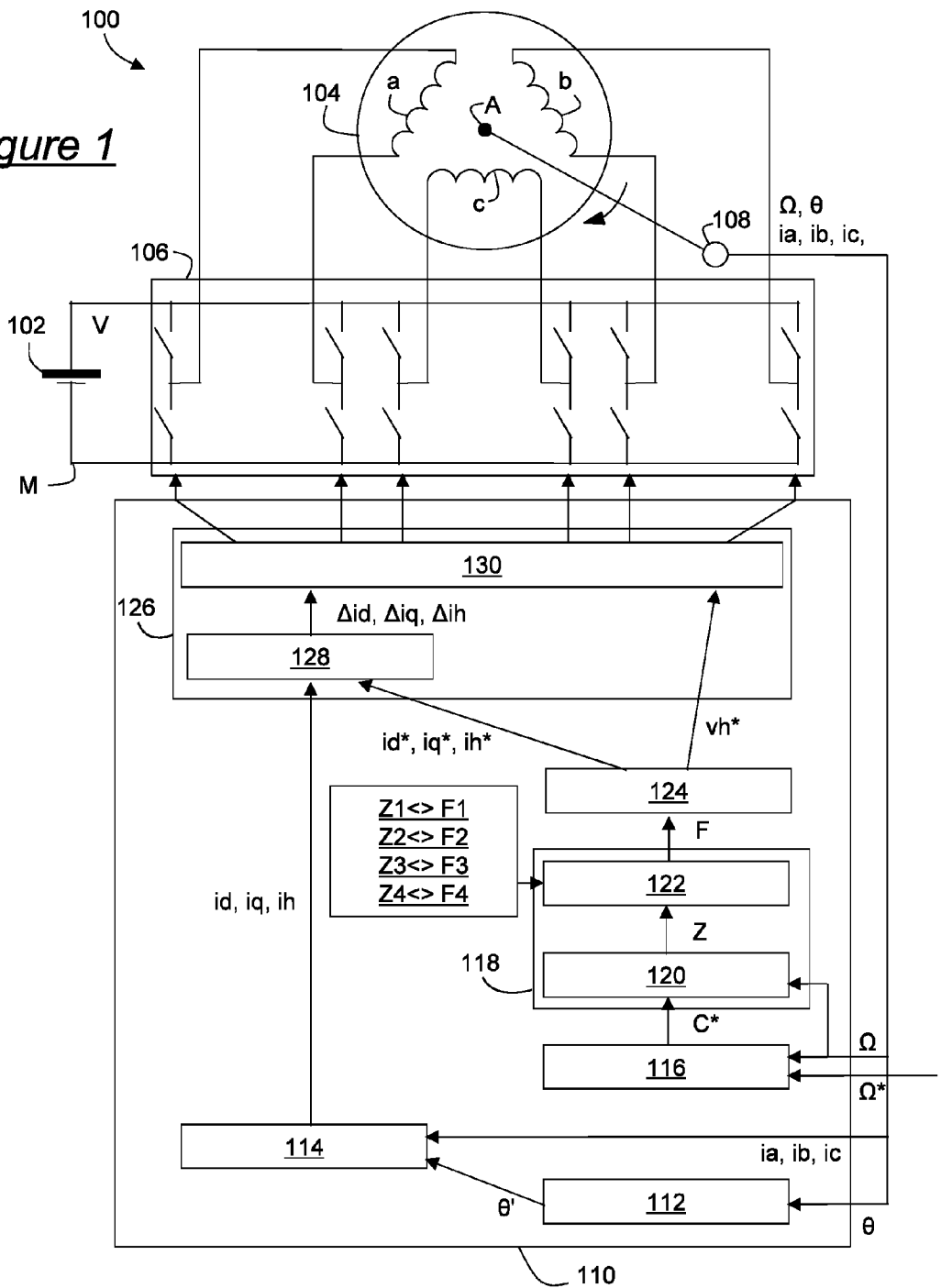
FIG. 1 is a diagram of a rotary drive system according to the invention.

With reference to FIG. 1, a rotary drive system 100 according to the invention will now be described.

The rotary drive system 100 firstly comprises a direct voltage source 102 for supplying a direct voltage V in relation to a reference electric potential M (ground).

The rotary drive system 100 further comprises an electric motor 104. In a manner known per se, the electric motor 104 comprise a stator (not shown) and a rotor (not shown) for rotating in relation to the stator about an axis of rotation A, at a speed $\Omega$ and supplying a torque, referred to as an electromagnetic torque C. In the example described, the electric motor 104 further comprises three phases a, b, c having directions evenly distributed about the axis of rotation A, and p poles. Each phase a, b, c has two terminals, and the phases a, b, c are independent, i.e. they are not connected by one of the terminals thereof to a common point, commonly referred to as "neutral". The phases a, b, c are intended to be respectively traversed by phase currents ia, ib, is and to have phase voltages va, vb, vc between the terminals thereof.

The rotary drive system 100 further comprises an inverter 106 for connecting each phase a, b, c of the electric motor 104 to the direct voltage source 102. The inverter 106 comprises six arms, each associated with a respective terminal of the phases a, b, c. Each arm is intended to connect the associated terminal thereof with the voltage V or the ground M. Each arm thus comprises two switches controlled in series, connected at the centre thereof to the associated terminal. The inverter 106 is thus intended to apply to each phase a, b, c: the voltage +V, the reverse thereof −V, or zero voltage when the two terminals of the phase in question are both connected to the same point (V or M).

The rotary drive system 100 further comprises a sensor 108 for measuring the rotation speed Ω of the rotor in relation to the stator, the phase currents ia, ib, ic and the angle, annotated θ, between the rotor and the stator.

The rotary drive system 100 further comprises a control device 110 for controlling the inverter 106, the control device 110 being intended to supply a command to the inverter 106 for controlling the inverter 106 according to the speed Ω, the phase currents ia, ib, ic, the angle θ and a rotational speed set-point Ω* of the rotor in relation to the stator. The speed set-point Ω* is for example received from a speed regulator when the system 100 is implemented in a motor vehicle. The command of the inverter 106 generally consists of very high-frequency switch opening/closing commands. The control device 110 is for example embodied in the form of a computer. In this case, the means of the control device 110 detailed hereinafter are for example embodied in the form of computer programs recorded on a computer medium and run by the computer, and/or in the form of dedicated electronic circuits of the computer.

The control device 110 firstly comprises means 112 for determining a useful angle θ' based on the mechanical angle θ. The useful angle θ' is for example equal to this mechanical angle θ, or equal to the electrical angle equal to this mechanical angle θ multiplied by the number of pairs of poles p of the electric motor 104.

The control device 110 further comprises means 114 for applying Park's transformation (also referred to as dq0 transformation) to the phase current ia, ib, ic for determining the direct current id, the quadrature current iq and the homopolar current ih. The currents id, iq and ih are given according to the formula:

$$\begin{bmatrix} id \\ iq \\ ih \end{bmatrix} = \sqrt{\frac{2}{3}} \begin{bmatrix} \cos(\theta') & \cos\left(\theta' - \frac{2\pi}{3}\right) & \cos\left(\theta' + \frac{2\pi}{3}\right) \\ \sin(\theta') & -\sin\left(\theta' - \frac{2\pi}{3}\right) & -\sin\left(\theta' + \frac{2\pi}{3}\right) \\ \frac{\sqrt{2}}{2} & \frac{\sqrt{2}}{2} & \frac{\sqrt{2}}{2} \end{bmatrix} \begin{bmatrix} ia \\ ib \\ ic \end{bmatrix}$$

As such, each phase current ia, ib, is comprises one component from the direct current id and quadrature current iq, and one component from the homopolar current ih.

The control device 110 further comprises means 116 for determining an electromagnetic torque set-point C* of the electric motor 104 based on the speed Ω and the speed set-point Ω*.

The control device 110 further comprises means 118 for selecting a formula, said means 118 being intended to select a formula F from different predefined formulas, for example saved in a memory. The predefined formulas are four in number in the example described and annotated F1, F2, F3, F4. Each predefined formula F1, F2, F3, F4 is intended to calculate either a homopolar voltage set-point, or a homopolar current set-point. As such, each formula defines the homopolar electrical quantity to be controlled: either the homopolar current ih, or the homopolar voltage vh. Preferably, at least one formula is intended to calculate a homopolar current set-point, and at least one other formula is intended to calculate a homopolar voltage set-point. In the example described, the formulas F1, F2 are intended to calculate a homopolar current set-point, whereas the formulas F3, F4 are intended to calculate a homopolar voltage set-point. The formulas F1, F2, F3, F4 will be described in more detail hereinafter.

In the example described, the selection is made based on at least one parameter relating to the rotary drive system 100. More specifically, in the example described, two parameters relating to the electric motor 104 are used: the speed Ω and the torque set-point C*. The speed Ω is an operating characteristic of the electric motor 104, whereas the torque set-point C* is a control characteristic of the electric motor 104.

In the example described, the means 118 for selecting a formula comprise definitions of zones of the space defined by the parameters relating to the drive system 100. These definitions are for example saved in a memory. In the example described wherein two parameters relating to the electric motor 104 are used, this space is two-dimensional, i.e. plane. In the example described, four zones Z1, Z2, Z3, Z4 are defined and each zone Z1, Z2, Z3, Z4 is respectively associated with one of the formulas F1, F2, F3, F4. Furthermore, in the example described, each zone Z1, Z2, Z3, Z4 is associated with a formula for calculating the direct current set-point id* and with a formula for calculating the quadrature current set-point iq*.

As such, in the example described, the means 118 for selecting a formula firstly comprise means 120 for determining a zone, said means 120 being intended to determine, from the predefined zones, the zone Z corresponding to the parameters relating to the electric motor 104, i.e. in the example described, corresponding to the speed Ω and to the torque set-point C*.

The means 118 for selecting a formula further comprise means 122 for retrieving the formula F associated with the zone Z determined by the means 120 for determining the zone, and retrieving the formulas for calculating the direct and quadrature current set-point.

The control device 110 further comprises means 124 for determining a set-point, said means 124 being intended to determine a direct current set-point id*, a quadrature current set-point iq* and either a homopolar current set-point ih, or a homopolar voltage set-point vh, by applying the formulas selected and particularly the formula F selected for the homopolar quantity.

The control device 110 further comprises means 126 for determining a command, said means 126 being intended to determine the command of the inverter 106 based on the set-points determined, and in particular the homopolar current set-point, or the homopolar voltage set-point, according to the circumstances.

In the example described, the means 126 for determining a command comprises means 128 for determining deviations, said means 128 being intended to determine direct current deviations Δid, a quadrature current deviation Δiq and, when the homopolar electrical quantity to be controlled is the homopolar current ih, a homopolar current deviation Δih. These deviations are determined based on the comparison, respectively, of the direct current id with the direct current set-point id*, of the quadrature current iq with the quadrature current set-point iq*, and of the homopolar current ih with the homopolar current set-point ih*.

The means 126 for determining a command further comprise means 130 for calculating a command, said means 130 being intended to calculate the command of the inverter 106 based on the deviations $\Delta id$, $\Delta iq$ and $\Delta ih$ when the homopolar electrical quantity to be controlled is the homopolar current set-point ih, or based on the previous deviations $\Delta id$, $\Delta iq$ and the homopolar voltage set-point vh* when the homopolar electrical quantity to be controlled is the homopolar voltage vh.

Figure 2:
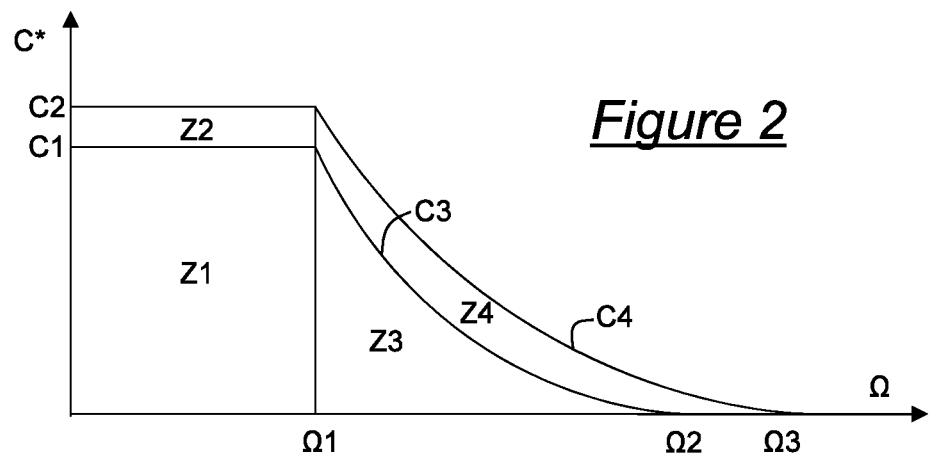
FIG. 2 is a diagram illustrating a plurality of operating zones.

With reference to FIG. 2, in the example described, four zones Z1, Z2, Z3, Z4 are defined in the plane of the parameters relating to the electric motor 104, i.e. in the plane $C^*$–$\Omega$.

The zone Z1 corresponds to a torque set-point C* less than a threshold C1 and to a speed $\Omega$ less than a threshold $\Omega 1$.

The speed threshold $\Omega 1$ preferably corresponds to phase voltages va, vb, vc all equal to voltage V of the direct voltage source 102.

The zone Z1 is associated, as the homopolar electrical quantity G to be controlled, with the homopolar current and with the following formula F1 for calculating the homopolar current set-point ih*:

$$ih^* = 0 \hspace{2cm} \text{F1:}$$

Furthermore, the zone Z1 is further associated with the following formulas for calculating direct current id* and quadrature current iq* set-points:

$$id^* = 0$$

$$iq^* = k\ C^*, \text{ where } C^* \leq C1$$

As such, since no homopolar current is allowed in the zone Z1, losses are at a minimum level in the electric motor 104. This strategy can be used while the speed has not reached the speed threshold $\Omega 1$ corresponding to the voltage V of the direct voltage source 102, or while the torque set-point is less than the threshold C2 corresponding to the current limits that the inverter 106 is able to supply.

The zone Z2 corresponds to a torque set-point C* between the threshold C1 and a threshold C2, and to a speed $\Omega$ less than the threshold $\Omega 1$.

The zone Z2 is associated with the following formula F2 for calculating the homopolar current set-point ih*:

$$ih^* = k2 \sin(3p\ \Omega t + \phi 2) \hspace{2cm} \text{F2:}$$

As such, the homopolar current set-point ih* is in the form of a third harmonic, i.e. a frequency wave three times higher than the fundamental frequency of the phase currents, this fundamental frequency having a frequency equal to the rotational speed $\Omega$ multiplied by the number of pairs of poles p of the electric motor 104.

The coefficient k2 and the phase shift $\phi 2$ are chosen so as to reduce the peak value of the phase currents ia, ib, ic. In theory, the optimal case is obtained when the phase shift $\phi 2$ is zero.

Furthermore, the zone Z2 is associated with the following formulas for calculating the direct current id* and quadrature current iq* set-points:

$$id^* = 0$$

$$iq^* = k\ C^*, \text{ where } C^* \leq C2$$

As a general rule, each phase current ia, ib, ic is limited by a current limit imax corresponding to the structure of the inverter 106. In the absence of other components and particularly of a homopolar component, the fundamental component, annotated H1, is thus also limited by this limit imax.

However, in the zone Z2, each phase current ia, ib, ic supplied by the inverter 106 comprises a fundamental component H1 and a homopolar component H3. In the zone Z2, the direct and quadrature current set-points id*, iq* give rise to the presence of a fundamental component H1 greater than imax, whereas the set-point of the homopolar component H3 is chosen to reduce the peak value of the current, such that the sum of the fundamental component H1 and the homopolar component H3 remains below the current limit imax. The following formulas sum up the above:

$$H1 + H3 \leq imax$$

$$\text{Max}(H1) > imax$$

As such, the electric motor 104, responding to the fundamental current component H1 received (and very slightly to the homopolar component H3), can attain greater torques in the zone Z2 than in the zone Z1 since the fundamental component is higher, at the expense of losses arising from the presence of the homopolar component H3.

The zone Z3 corresponds to a speed $\Omega$ between the threshold $\Omega 1$ and a threshold $\Omega 2$, and to a torque set-point C* less than a threshold C3 which decreases when the speed $\Omega$ increases, from the threshold C1 when the speed $\Omega$ is equal to the threshold $\Omega 1$ up to a zero threshold when the speed $\Omega$ is equal to the threshold $\Omega 2$.

The zone Z3 is associated with the following formula F3 for calculating the homopolar voltage set-point vh*:

$$vh^* = k3 \sin(3p\ \Omega t + \phi 3) \hspace{2cm} \text{F3:}$$

As such, the homopolar voltage set-point vh* is in the form of a third harmonic, i.e. a frequency wave three times higher than the fundamental frequency of the phase currents, this fundamental frequency having a frequency equal to the rotational speed $\Omega$ multiplied by the number of pairs of poles p of the electric motor 104.

Furthermore, the zone Z3 is associated with the following formulas for calculating direct current id* and quadrature current iq* set-points:

$$id^* = f(iq^*, ih^*, \Omega, V)$$

$$iq^* = k\ C^*$$

where f is a suitably chosen function, and where $C^* \leq C3$.

As a general rule, each phase voltage va, vb, vc is limited by the voltage V of the direct voltage source 102. In the absence of other components and particularly of a homopolar component, the fundamental component, annotated H1, is thus also limited by this voltage V.

However, in the zone Z3, each phase voltage va, vb, vc supplied by the inverter 106 comprises a fundamental component H1 and a homopolar component H3. In the zone Z3, the direct and quadrature current set-points id*, iq* give rise to the presence of a fundamental component H1 greater than V, whereas the set-point of the homopolar component H3 is chosen to reduce the peak value of the voltage, such that the sum of the fundamental component H1 and the homopolar component H3 remains below the voltage limit V. The following formulas sum up the above:

$$H1 + H3 \leq V$$

$$\text{Max}(H1) > V$$

As such, the electric motor 104, responding to the fundamental voltage component H1 received (and very slightly to the homopolar component H3), can attain greater speeds in the zone Z3 than in the zone Z1 since the fundamental component is higher, at the expense of losses arising from the presence of the homopolar component H3.

The zone Z4 corresponds to a speed Ω between the threshold Ω1 and a threshold Ω3, and a torque set-point C* between the zone 3 and a threshold C4 which decreases when the speed Ω increases, from the threshold C2 when the speed Ω is equal to the threshold Ω1 up to a zero threshold when the speed Ω is equal to the threshold Ω3.

The zone Z4 is associated with the following formula F4 for calculating the homopolar voltage set-point vh*:

$$vh^* = k4 \sin(3p \, \Omega t + \phi 4) \qquad \text{F4:}$$

Furthermore, the zone Z4 is associated with the following formulas for calculating direct current id* and quadrature current iq* set-points:

$$id^* = g(iq^*, ih^*, \Omega, V)$$

$$iq^* = k \, C^*$$

where g is a suitably chosen function, and where $C^* \leq C4$.

In the zone Z4, each phase voltage va, vb, vc supplied by the inverter 106 comprises a fundamental component H1 and a homopolar component H3. As a result, each phase current ia, ib, is supplied by the inverter 106 comprises a fundamental component H'1 and a homopolar component H'3. In the zone Z4, the direct and quadrature current set-points id*, iq* give rise to the presence of a fundamental component H1 greater than V, and, at the same time, the presence of a fundamental component H'1 greater than imax. The set-point of the homopolar component H3 is chosen, on the one hand, so as to reduce the peak value of the voltage, such that the sum of the fundamental component H1 and the homopolar component H3 remains below the voltage limit V, and, on the other hand, so as to induce a homopolar component H'3 decreasing the peak current value such that the sum of the fundamental component H'1 and the homopolar component H'3 remains below the current limit imax. The following formulas sum up the above:

$$H1 + H3 \leq V$$

$$H'1 + H'3 \leq imax$$

$$\text{Max}(H1) > V$$

$$\text{Max}(H'1) > imax$$

As such, the electric motor 104, responding to the fundamental components H1, H'1 received (and very slightly to the homopolar components H3, H'3), can attain greater speeds and torques in the zone Z4 than in the zone Z3 since the fundamental components H1, H'1 are higher therein, at the expense of losses arising from the presence of the homopolar components H3, H'3.

Alternatively, the zone Z4 is associated with the following formula F4 for calculating the homopolar current set-point ih*:

$$ih^* = k'4 \sin(3p \, \Omega t + \phi' 4) \qquad \text{F4:}$$

Figure 3:
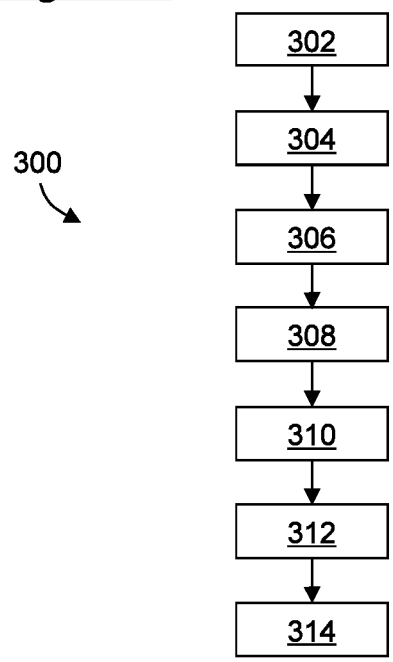
FIG. 3 is a block diagram of a method for controlling an inverter of the system in FIG. 1.

With reference to FIG. 3, a method 300 for controlling the inverter 106 will now be described.

During a step 302, the sensor 108 measures the speed Ω, the angle θ and the phase currents ia, ib, ic, and supplies these measurements to the control device 110.

During a step 304, the means 112 for determining a useful angle determine the useful angle θ' based on the mechanical angle θ.

During a step 306, the means 114 for applying Park's transformation determine the direct id, quadrature iq and homopolar ih current.

During a step 308, the means 116 for determining a set-point determine a torque set-point C* based on the speed Ω and the speed set-point Ω*.

During a step 310, the means 118 for selecting a formula select a formula F from the predefined formulas F1, F2, F3, F4.

During a step 312, the means 124 for determining a set-point determine a direct current set-point id*, a quadrature current set-point iq* and either a homopolar current or homopolar voltage set-point, by applying the formula F selected.

During a step 314, the means 126 for determining a command determine a command of the inverter 106, particularly based on the homopolar set-point defined in step 312, and apply this command to the inverter 106.

As explained above, each phase current ia, ib, ic, and each phase voltage va, vb, vc, has a component from the homopolar current ih, or the homopolar voltage. As such, by adjusting the homopolar current, or the homopolar voltage, by means of a suitably chosen set-point, it is possible to modify the shape of the phase currents ia, ib, ic, or phase voltages va, vb, vc, as required.

The invention is not limited to the example of an embodiment described above, but on the contrary defined by the appended claims, the scope whereof extends to any alternative modifications and configurations suitable for being designed using the general knowledge of a person skilled in the art.

In particular, rather than applying a zero homopolar current in the zone Z1, a constant homopolar voltage could be applied.

The invention claimed is:

1. Rotary drive system (100) comprising:
   a direct voltage source (102),
   an electric motor (104) having an axis of rotation (A), and comprising independent phases (a, b, c) having directions about the axis of rotation (A),
   an inverter (106) for connecting each phase (a, b, c) to the direct voltage source (102), and
   a control device (110) for supplying a command to the inverter (106),
   characterised in that the control device (110) comprising:
   means (118) for selecting a formula, said means (118) being intended to select a formula from predefined formulas, each predefined formula being intended to calculate either a homopolar voltage set-point, or a homopolar current set-point,
   means (124) for determining a set-point, said means (124) being intended to apply the selected formula to determine, according to the formula selected, either a homopolar voltage set-point, or a homopolar current set-point, and
   means (126) for determining a command, said means (126) being intended to determine the command of the inverter (106) based on the set-point determined.

2. Rotary drive system (100) according to claim 1, wherein the means (118) for selecting a formula are intended to make the selection based on at least one parameter relating to the rotary drive system (100).

3. Rotary drive system (100) according to claim 2, wherein the parameter(s) relating to the rotary drive system (100) include an operating characteristic of the electric motor (104), for example the rotational speed (Ω) thereof.

4. Rotary drive system (100) according to claim 1, wherein the means (118) for selecting a formula comprise:
- definitions of zones of the space defined by the parameter(s) relating to the rotary drive system (100), each zone being associated with one of the predefined formulas (F1, F2, F3, F4),
- means (120) for determining a zone, said means (120) being intended to determine, from the predefined zones, the zone (Z) corresponding to the parameter(s) relating to the rotary drive system (100), and
- means (122) for retrieving the formula (F) associated with the zone (Z) determined by the means (120) for determining a zone.

5. Rotary drive system (100) according to claim 4, wherein the means (118) for selecting a formula comprise at least one definition of a zone (Z1, Z2) associated with a formula (F1, F2) for calculating a homopolar current set-point.

6. Rotary drive system (100) according to claim 4, wherein the means (118) for selecting a formula comprise at least one definition of a zone (Z3, Z4) associated with a formula (F3, F4) for calculating a homopolar voltage set-point.

7. Rotary drive system (100) according to claim 4, wherein the means (118) for selecting a formula comprise at least one definition of a zone (Z2, Z3, Z4) associated with a formula (F2, F3, F4) for calculating a set-point in the form of a homopolar harmonic, for example in the form of the first homopolar harmonic.

8. Rotary drive system (100) according to claim 4, wherein the means (118) for selecting a formula comprise at least one definition of a zone (Z1) associated with a formula (F1) for supplying a zero set-point.

9. Method for controlling an inverter for connecting, to a direct voltage source (102), each phase (a, b, c) of an electric motor (104) having an axis of rotation (A), and comprising independent phases (a, b, c) having directions about the axis of rotation (A), the method comprising:
- selecting (310) a formula from predefined formulas, each predefined formula being intended to calculate either a homopolar voltage set-point, or a homopolar current set-point,
- applying (312) the selected formula to determine, according to the formula selected, either a homopolar voltage set-point, or a homopolar current set-point, and
- determining (314) a command of the inverter (106) based on the set-point defined.

10. Computer program comprising instructions which, when run on a computer, cause the computer to perform the steps of a method according to claim 9.

11. Rotary drive system (100) according to claim 2, wherein the means (118) for selecting a formula comprise:
- definitions of zones of the space defined by the parameter(s) relating to the rotary drive system (100), each zone being associated with one of the predefined formulas (F1, F2, F3, F4),
- means (120) for determining a zone, said means (120) being intended to determine, from the predefined zones, the zone (Z) corresponding to the parameter(s) relating to the rotary drive system (100), and
- means (122) for retrieving the formula (F) associated with the zone (Z) determined by the means (120) for determining a zone.

12. Rotary drive system (100) according to claim 3, wherein the means (118) for selecting a formula comprise:
- definitions of zones of the space defined by the parameter(s) relating to the rotary drive system (100), each zone being associated with one of the predefined formulas (F1, F2, F3, F4),
- means (120) for determining a zone, said means (120) being intended to determine, from the predefined zones, the zone (Z) corresponding to the parameter(s) relating to the rotary drive system (100), and
- means (122) for retrieving the formula (F) associated with the zone (Z) determined by the means (120) for determining a zone.

13. Rotary drive system (100) according to claim 5, wherein the means (118) for selecting a formula comprise at least one definition of a zone (Z3, Z4) associated with a formula (F3, F4) for calculating a homopolar voltage set-point.

14. Rotary drive system (100) according to claim 5, wherein the means (118) for selecting a formula comprise at least one definition of a zone (Z2, Z3, Z4) associated with a formula (F2, F3, F4) for calculating a set-point in the form of a homopolar harmonic, for example in the form of the first homopolar harmonic.

15. Rotary drive system (100) according to claim 6, wherein the means (118) for selecting a formula comprise at least one definition of a zone (Z2, Z3, Z4) associated with a formula (F2, F3, F4) for calculating a set-point in the form of a homopolar harmonic, for example in the form of the first homopolar harmonic.

16. Rotary drive system (100) according to claim 5, wherein the means (118) for selecting a formula comprise at least one definition of a zone (Z1) associated with a formula (F1) for supplying a zero set-point.

17. Rotary drive system (100) according to claim 6, wherein the means (118) for selecting a formula comprise at least one definition of a zone (Z1) associated with a formula (F1) for supplying a zero set-point.

18. Rotary drive system (100) according to claim 7, wherein the means (118) for selecting a formula comprise at least one definition of a zone (Z1) associated with a formula (F1) for supplying a zero set-point.

* * * * *